United States Patent
Kadoya

[11] 3,733,134
[45] May 15, 1973

[54] DEVICE FOR MEASURING MECHANICAL DEVIATION AT REMOTE LOCATION

[75] Inventor: Yoshiki Kadoya, Mure, Mitaka City, Tokyo, Japan

[73] Assignee: Kyowa Electronic Instruments Co., Ltd., Tokyo, Japan

[22] Filed: Dec. 28, 1970

[21] Appl. No.: 101,498

[52] U.S. Cl...................................356/152, 356/172
[51] Int. Cl..............................................G01b 11/26
[58] Field of Search........................356/141, 152, 25, 356/151, 120, 147, 138, 172; 250/231 SE, 233; 73/71.3

[56] References Cited

UNITED STATES PATENTS

| | | | |
|---|---|---|---|
| 3,006,236 | 10/1961 | Michaud | 356/147 |
| 3,104,391 | 9/1963 | Hansel | 343/118 |
| 3,659,948 | 5/1972 | De Lang | 356/172 |

Primary Examiner—Benjamin A. Borchelt
Assistant Examiner—S. C. Buczinski
Attorney—Silverman & Cass

[57] ABSTRACT

A measuring device for mechanical deviation or vibration at remote location comprising a first light source projecting a light beam onto the device, a condenser lens for collecting the projected light, a photoelectric element positioned at the focus of said condenser lens, a rotating drum rotating in constant speed and having its axis passing the focus in a direction normal to a plane including axis of the light beam and the direction of the deviation to be measured and being arranged to interrupt the path of the projected light beam between the condenser lens and the photoelectric element, and further comprising a local light source and a second photoelectric element being placed on both sides of the rotating drum. The rotating drum is provided with a plurality of slits spaced equidistantly on the periphery, parallel to the drum axis, so that to interrupt the path of projected light beam periodically to produce a first series of electric output pulses and to interrupt the path of the local light source impinging onto the second photoelectric element to produce second series of electric output pulses which consists of a reference pulse train. The device is fixed onto a body to be measured for the mechanical deviation or the vibration. The body is located at a remote place from the first light source. The mechanical deviation or vibration of the body will cause phase variation of the first series of electric output pulses and the deviation is detected by comparing the phase of the first electric pulse series with that of the second electric pulse series constituting reference pulse series.

8 Claims, 6 Drawing Figures

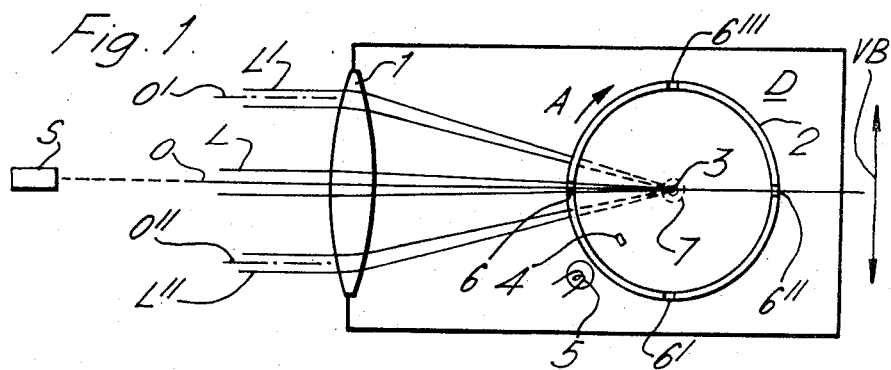
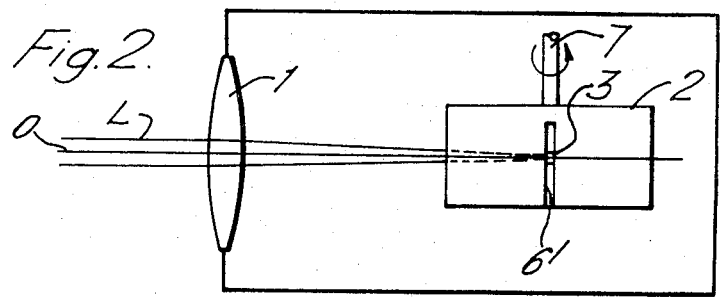
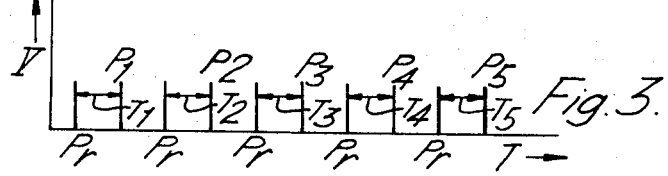
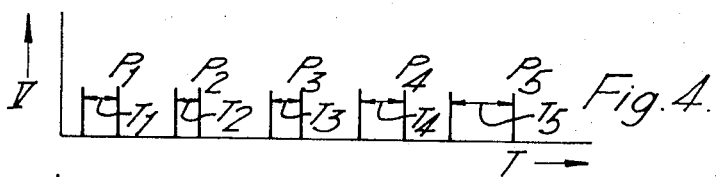
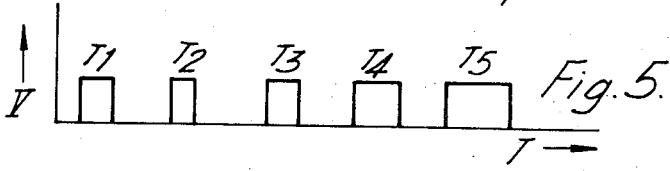
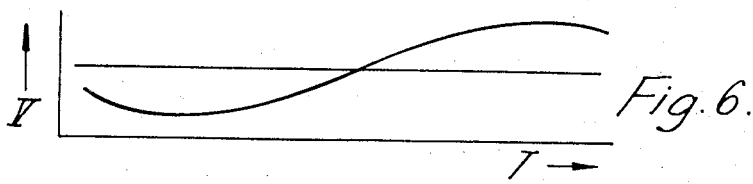
INVENTOR
YOSHIKI KADOYA
BY
Silverman & Cass
ATTORNEY

DEVICE FOR MEASURING MECHANICAL DEVIATION AT REMOTE LOCATION

BACKGROUND OF THE INVENTION

1. Field of the Invention:

The present invention relates to a measuring device for mechanical deviation or vibration located at remote a place and to a device able to detect such deviation with very high accuracy and able to display the amount of detected deviation very easily.

2. Description of the Prior Arts:

In a particular field of industry, it is desired to measure a mechanical deviation or vibration of a body, such as, for instance, a building structure, with very high accuracy. More especially, it is desired to measure such deviation of a body or structure placed at a far distant place, for instance on an order of several hundred meters, with very high accuracy. It has not been proposed for such a device to be able to effect the measurement while having very simple construction.

SUMMARY OF THE INVENTION

The present invention has for its object to realize such a device by using a projection of a light beam and very simple construction to measure such mechanical vibration or mechanical deviation of a body placed at a distant place.

In accordance with the present invention, a concentrated light beam, which may be a laser beam, produced from a source located at a reference point, is projected onto the measuring device secured to the body or structure to be measured for its mechanical deviation or vibration placed at a far distant site from the reference point. The projected light is received by a photoreceptive part of the measuring device. The photoreceptive part of the device constitutes the main part of the present invention. If the measuring body, i.e., the photoreceptive part vibrates or deviates against the projected light beam, a corresponding deviation of an output electric signal is derived and the mechanical deviation is indicated by an electric output signal obtained by a comparison of the deviation of the output electric signal with a reference signal derived from the same measuring device.

BRIEF DESCRIPTION OF THE DRAWING

The foregoing and other object, features and advantages of the present invention will be apparent from the following description of a specific embodiment of the invention, as illustrated in the accompanying drawings, in which:

FIG. 1 is a schematic side view of the device according to the present invention;

FIG. 2 is a plan view of the device shown in FIG. 1;

FIGS. 3, 4, 5 and 6 are electric wave form diagrams showing output signals of the device according to the present invention.

DESCRIPTION OF THE PREFERRED EMBODIMENT

FIGS. 1 and 2 show schematically photoreceptor part of the device according to the present invention.

In FIG. 1, S is a first light source located at a static point, which will be a reference point of this measurement. From the light source S a sharp light beam L, which preferably is a laser beam, is projected onto the measuring device. The light beam L has its axis indicated as 0. The measuring device according to the present invention is generally indicated by D and is secured on a body to be measured for its deviation or vibration.

The drawings just show the essential part of the measuring device, according to the present invention. The main optical device is termed as photoreceptor part. The photoreceptor part D comprises a condenser lens 1 having its focus at a suitable distance with respect to the deviation to be measured. A rotatable drum 2 is secured onto the device by means of its shaft 7, which has its axis adjusted to pass through the focus of the condenser lens 1. The drum 2 is provided with a plurality of slits 6, 6', 6'', ... cut parallel to the drum axis and provided equidistantly along the periphery of the drum 2. FIG. 1 indicates the case wherein four slits 6 – 6''' are provided, but this is just an illustration, and the present invention is not limited to this particular number of the slits.

The drum 2 is rotated in a constant speed by means of the shaft 7, more clearly shown in FIG. 2, which is driven by a driving device (not shown). A photoelectric element 3 is provided on the device at the focus of the condenser lens 1.

Assuming the case that the axis 0 of the light beam L is aligned with the axis of the condenser lens 1, the projected light L passes through center of the condenser lens 1 and then passes the slit 6 at an instant indicated in the drawing and impinges onto the photoelectric element 3 to produce an electric output pulse. If the measuring body keeps its position statically, the relative position of the device D against the light beam L remains unchanged and the photoelectric element 3 produces a series of pulses by the slits 6, 6', 6'', 6''', . . . Since the drum 2 rotates in constant speed, these pulses have an identical interval.

In FIG. 1 an arrow mark VB indicates the direction of deviation of the body to be detected. If the body moves upward relative to the light source S in the direction of VB, the incoming light beam L shows relative deviation toward down side and impinges onto the condenser lens 1 as for instance, at place 0''. On the contrary, if the body moves downward, the incoming light beam L seems to move upward relatively and impinges onto the condenser lens 1 at 0' as shown in the drawing. In case the body vibrates up and down along the direction VB the light beam L seems to make corresponding relative movement between light beam L' and light beam L''.

If the drum 2 is rotated in direction of arrow A, the deviation of light beam L toward lower side as indicated by light beam L'' causes leading phase of the produced output pulses. On the other hand, relative movement of the light beam L toward upper side as indicated by L' causes lagging of the phase of the produced output pulses.

The present invention is obtained by a principle of detecting above phase deviation of the output pulses which corresponds to the mechanical deviation of the measuring device.

In order to detect the electric phase deviation, a second light source 5 is provided as shown in FIG. 1. Also, a second photoelectric element 4 is provided to receive the output light of the second light source 5. The light source 5 and photoelectric element 4 are fixed onto the measuring device and are located opposite positions on both sides of the rotating drum 2. Accordingly, the photoelectric element 4 produces a regular output pulses by the moving slits irrespective of the movement of the body or the measuring device relative to the projected light beam L. According to the present invention, the second output pulses are utilized as a reference to detect the deviation of the device from the first series of the output pulses from the photoelectric element 3.

FIGS. 3, 4, 5 and 6 are the diagrams for explaining the detection of mechanical deviation electrically.

FIG. 3 shows output pulses P1, P2, P3, . . . derived from the photoelectric element 3 caused by the intermittent projection of the light beam L onto the element 3 through the moving slits 6, 6', 6'', . . . In FIG. 3, pulses Pr, Pr, . . . are the reference pulses derived from the second photoelectric element 4 caused by the intermittent projection of light from local light source 5 through the moving slits 6, 6', 6'', . . . .

FIG. 3 corresponds to a case, wherein the measuring object keeps its position statically. Accordingly, the time intervals of the pulses P1, P2, P3, . . . between each reference pulses, Pr, i.e., the time intervals T1, T2, T3, . . . have an identical value.

If the measuring body makes mechanical deviation or vibration in the direction of arrow VB, the photoreceptor part receives the projected light beam L at the deviated location as explained before. The relative deviation of the projected light beam L causes corresponding deviation of the phase of the derived pulse series, P1, P2, P3, . . . as indicated in FIG. 4.

There is a linear relationship between the mechanical deviation and the respective time deviation of the output pulses P1, P2, P3, . . . . Therefore, the mechanical deviation can be obtained by detecting the phase of the output pulses. More exactly, the corresponding mechanical deviation can be obtained by measuring the time intervals between respective output pulses P1, P2, P3, . . . and the each preceding reference pulse Pr.

FIG. 4 shows output pulses when the measuring body makes vibration in vertical direction.

There are various methods to detect the time intervals. Such methods are known and need not be explained in detail.

For instance, the pulses are shaped to form a square wave pulse train having each pulse width T1, T2, T3, . . . by means of logic circuits mainly consisting of flip-flop circuits. One example of such wave form is shown in FIG. 5.

According to the need, this pulse wave form can be supplied to a filter circuit and an analog wave form as shown in FIG. 6 may be obtained, so that a continuous measurement or observation of a vibrating phenomenon can be carried out.

If the vibration frequency of the measuring body is very high, the revolving speed of the rotating drum may be increased accordingly in order to obtain an accurate measuring result. If for measuring a phenomenon having a large mechanical deviation, a condenser lens having a comparatively long focus length may be used in order to avoid any astigmatic error.

In case a mechanical deviation or vibration in the horizontal direction is desired to be measured, the device of the present invention should be mounted on the measuring body so that the rotating drum axis is extended normal to the plane including the vibrating direction and the path of the projected light beam.

The light beam or the laser beam is preferably of a diameter of 2 – 3 mm or not exceeding 5 mm.

The present invention can be conveniently utilized for observation of deviation of high buildings, observation of a large structure for instance, a large bridge, deviation test of concrete dam, survey of flatness of ground, etc.

Recently, there is also interest to introduce a device according to the present invention to make a semipermanent observation of strain of structure of a very large ship. The bending of a ship body can easily be detected and continuously observed by selecting both the reference point and the measuring point on a ship body.

What is claimed is:

1. A mechanical deviation detecting device comprising a condenser lens receiving a projected light beam emanated from a distant reference point, a rotatable drum having its rotating axis passing through the focus of the condenser lens normal to a plane including the light beam and the direction of the deviation to be detected, wherein the drum is equipped with a plurality of slits provided on its periphery equidistantly in the direction of the axis and is driven to rotate in constant speed, and a first photoelectric element is placed at the focus of the condenser lens, whereby the element produces output electric pulses each of which having phase corresponding to the mechanical deviation to be detected.

2. A mechanical deviation detecting device as claimed in claim 1 further comprising a local light source and a second photoelectric element arranged in opposite positions adjacent both sides of the rotating drum to produce a reference pulse train having regular time interval irrespective of the mechanical deviation, wherein by comparing the first electric output pulses with the reference pulses the mechanical deviation is detected.

3. A mechanical deviation detecting device as claimed in claim 1, wherein the light beam is a laser beam.

4. A mechanical deviation detecting device as claimed in claim 2, wherein the light beam is a laser beam.

5. A mechanical deviation detecting device comprising a condenser lens receiving a projected light beam emanated from a distant reference point, a rotatable drum having its rotating axis passing through the focus of the condenser lens in direction normal to a plane including the path of the light beam and the direction of the deviation to be detected, whereby the drum is equipped with a plurality of equidistantly spaced slits extending parallel to the drum axis on the periphery of the drum and the drum rotates in constant speed to allow to pass the projected light intermittently inside the drum, a first photoelectric element placed at the focus of the condenser lens to receive the intermittently projected light beam and to produce electric output pulses corresponding to the time of the excitation, a local light source and a second photoelectric element placed at both sides of the drum in opposite positions to produce an intermittently excited electric output signal having constant phase used as a reference irrespective of the movement of the device, whereby the deviation is detected by comparing the phase of the output pulse of the first photoelectric element with that of the reference output pulse.

6. A mechanical deviation detecting device as claimed in claim 5, wherein the projected light beam is a laser beam.

7. A mechanical deviation detecting device as claimed in claim 5, wherein the output pulses are shaped to indicate a square wave form.

8. A mechanical deviation detecting device as claimed in claim 5, wherein the output pulses are shaped to be an oscillatory wave form directly representing the oscillation of the device.

* * * * *